US006994285B2

United States Patent
Satoh et al.

(10) Patent No.: US 6,994,285 B2
(45) Date of Patent: Feb. 7, 2006

(54) TAPE CARTRIDGE

(75) Inventors: Takateru Satoh, Tokyo (JP); Motohiko Shima, Tokyo (JP); Akio Momoi, Tokyo (JP); Hiroki Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 167 days.

(21) Appl. No.: 10/307,930

(22) Filed: Dec. 3, 2002

(65) Prior Publication Data
US 2003/0146327 A1 Aug. 7, 2003

(30) Foreign Application Priority Data
Dec. 3, 2001 (JP) ............................. 2001-369043

(51) Int. Cl.
*G11B 23/107* (2006.01)
(52) U.S. Cl. ...................................... 242/348; 360/132
(58) Field of Classification Search ................ 242/348, 242/340, 341, 342, 338, 343, 343.1, 343.2, 242/345.1; 360/132, 96.3
See application file for complete search history.

(56) References Cited

U.S. PATENT DOCUMENTS

| 6,092,755 | A  | * | 7/2000  | Konishi et al. ............. 360/96.3 |
| 6,315,230 | B1 | * | 11/2001 | Hansen et al. .............. 242/348 |
| 6,411,466 | B1 | * | 6/2002  | Shima et al. ................ 360/132 |
| 6,452,747 | B1 | * | 9/2002  | Johnson et al. ............. 360/132 |
| 6,491,247 | B2 | * | 12/2002 | Huettenegger .............. 360/132 |
| 6,680,818 | B1 | * | 1/2004  | Morita et al. ................ 360/132 |
| 6,736,345 | B2 | * | 5/2004  | Hiraguchi et al. |
| 6,745,968 | B1 | * | 6/2004  | Schoettle et al. ........... 242/348 |

FOREIGN PATENT DOCUMENTS

| JP | U 4-45359   |   | 4/1992  |
| WO | WO 99/65032 | * | 12/1999 |

* cited by examiner

Primary Examiner—William A. Rivera
(74) Attorney, Agent, or Firm—Oliff & Berridge, PLC

(57) ABSTRACT

In a region more on the back surface side than on the front surface of the circumferential side surface of a magnetic plate, a circumferential projection having an outer diameter larger than that on the front surface side is formed, and the magnetic plate is fitted to a circular reel portion so as to be embedded in the circular reel portion at the circumferential projection thereof.

5 Claims, 5 Drawing Sheets

PRIOR ART

Fig.8

PRIOR ART

TAPE CARTRIDGE

DETAILED DESCRIPTION OF THE INVENTION

1. Field of the Invention

The present invention relates to a tape cartridge storing a magnetic tape.

2. Description of the Related Art

Figure 6:
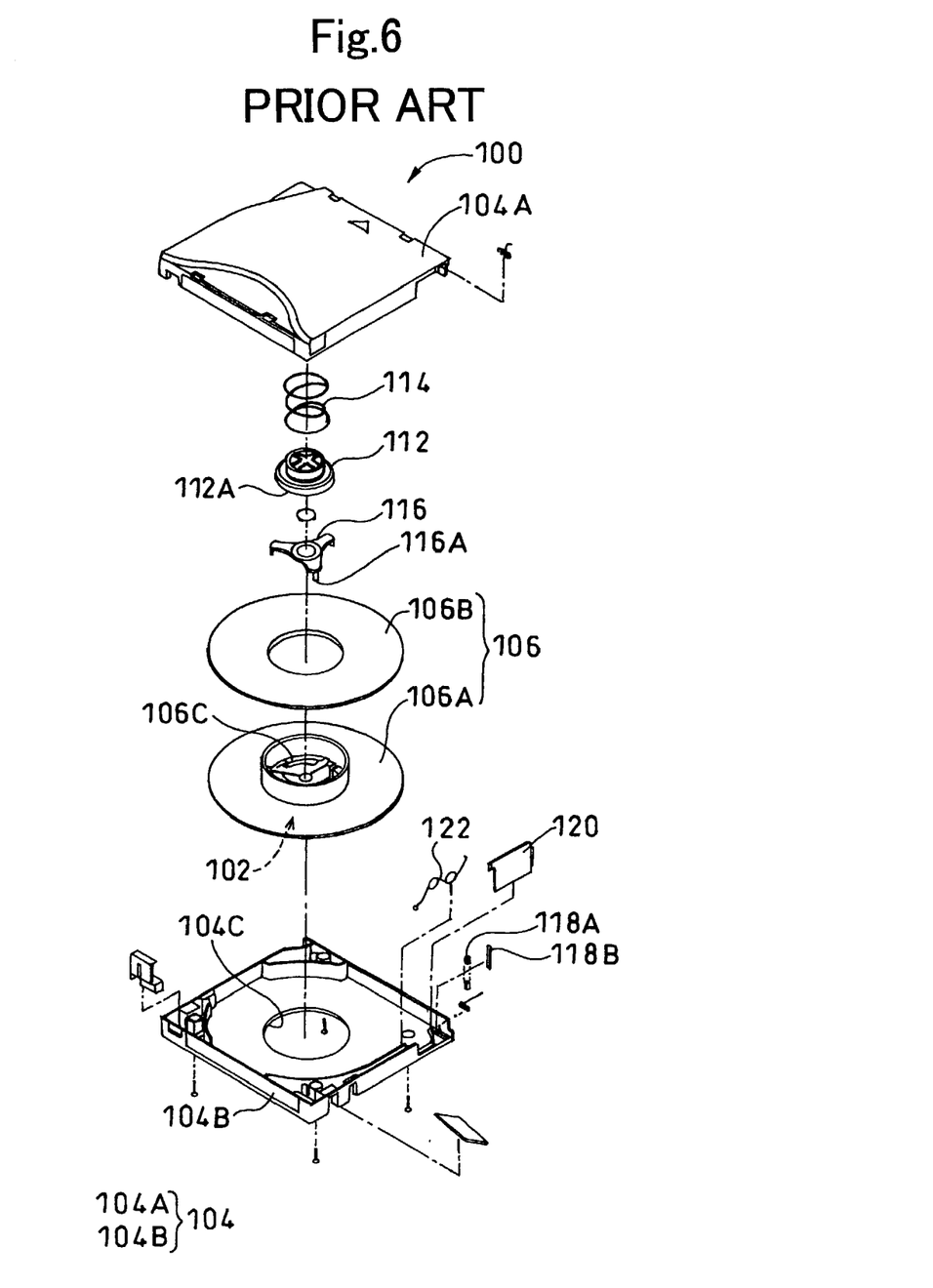
FIG. 6 is a general perspective view showing an entire configuration of a conventional tape cartridge.
Figure 7:
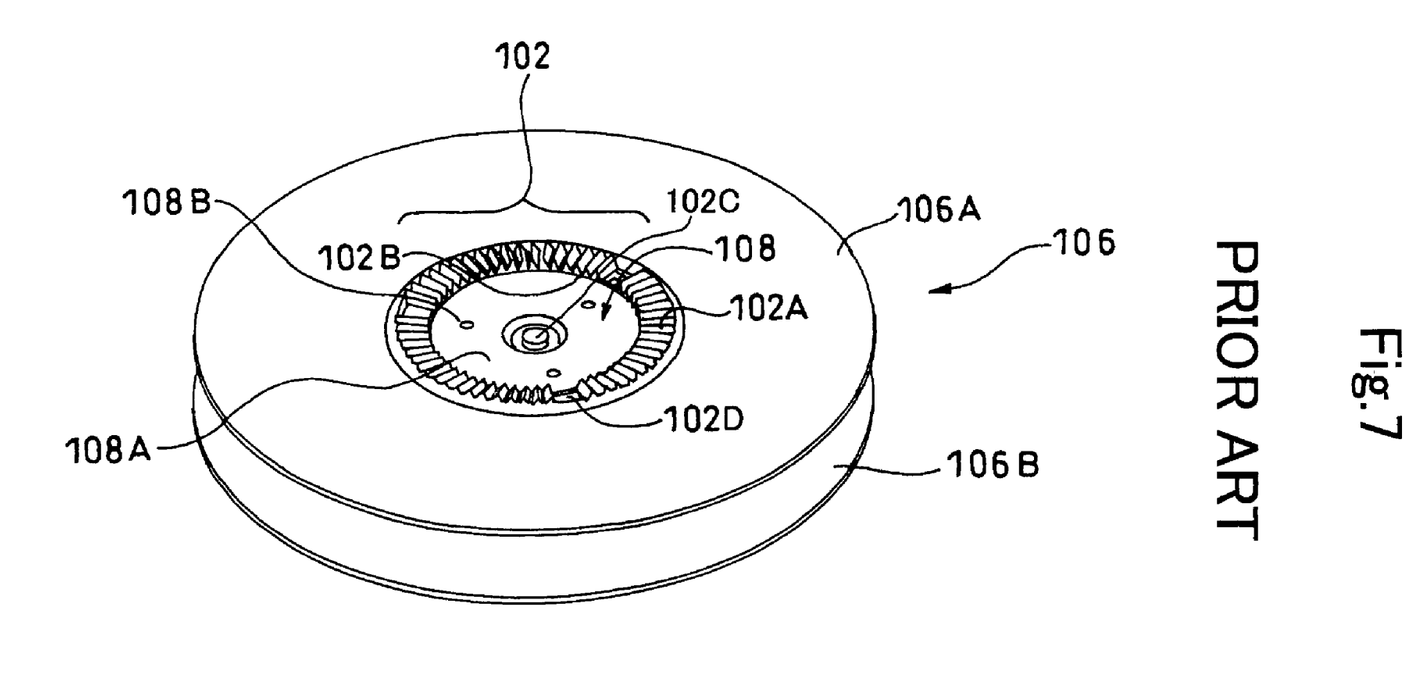
FIG. 7 is an expanded perspective view showing a tape reel in the tape cartridge of FIG. 6.
Figure 8:
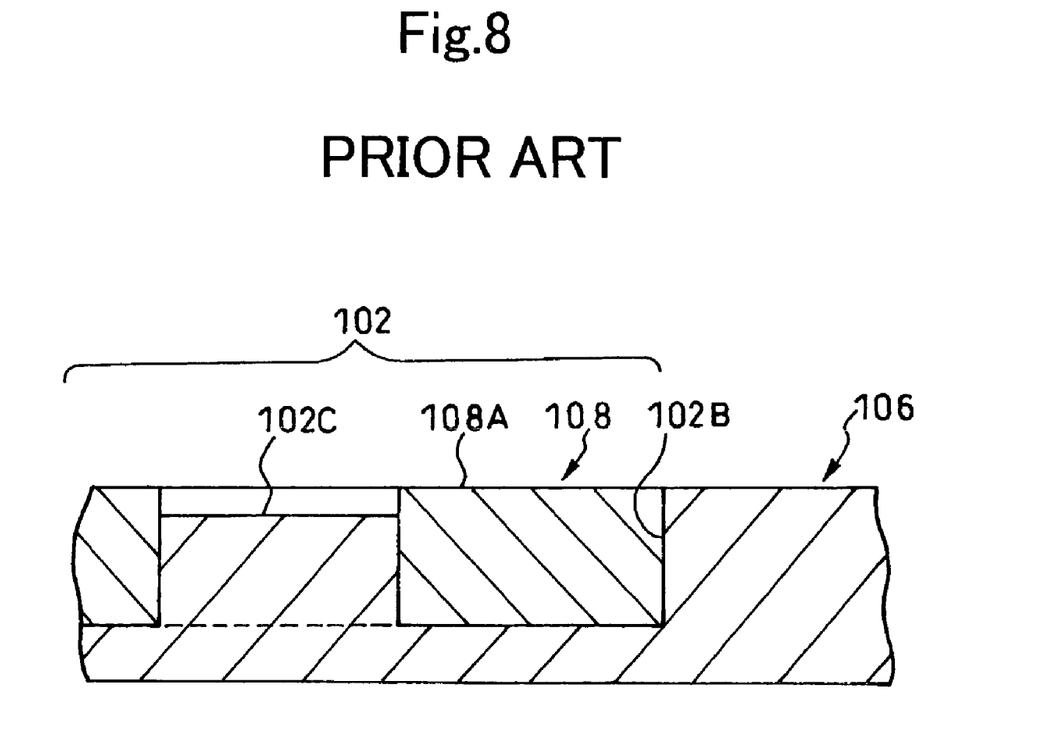
FIG. 8 is a side sectional view showing a fitted configuration of a magnetic plate in the tape cartridge of FIG. 6.

There is a known conventional tape cartridge as shown in FIGS. 6 to 8 in which a tape can be wound/unwound as the cartridge is engaged with an external driving member (not shown) provided at a reading device (not shown) such as a large capacity LTO® (Linear Tape Open) cartridge.

The tape cartridge denoted by reference numeral 100 includes a circular reel portion 106 and a magnetic plate 108. The circular reel portion 106 is made of resin. The circular reel portion 106 is stored in a case 104, and has a side end central part 102 in an axial direction facing the outside of the case 104, so that the circular reel portion 106 can be engaged/disengaged to/from the external driving member. The magnetic plate 108 is a magnetic disk shaped member and fitted to the side end central part 102 of the circular reel portion 106 so that one surface 108A in the thickness-wise direction is exposed. The magnetic plate 108 attracts the external driving member by magnetic force to allow the external driving member and the circular reel portion 106 to engage with each other.

Herein, the term "magnetic" is defined as "being prone to serve as a magnet in a magnetic field" as is the case with iron, nickel or the like and is not limited to the definition of "having the properties of a magnet," in other words generating a magnetic field in itself.

The case 104 has a first case 104A and a second case 104B combined with each other, and there is a circular hole 104C in the center of the second case 104B.

The circular reel portion 106 includes a reel hub 106A and a reel flange 106B integrally united by ultrasonic welding. The reel hub 106A has the side end central part 102 formed thereon. The side end central part 102 faces the outside through the circular hole 104C of the second case 104B. The side end central part 102 has teeth 102A projecting axially outwardly along the circumferential direction, and the teeth can be engaged with teeth (not shown) formed at the external driving member. A circular recess 102B is formed on the inner side of the teeth 102A in the radial direction, and there is a circular raised portion 102C in the center of the bottom of the recess 102B.

The magnetic plate 108 is an annular disk shaped member having a hole in the center, and integrally formed with the reel hub 106A when the reel hub 106A is formed by resin-molding. The magnetic plate 108 has its outer circumferential surface fitted to the side surface of the recess 102B and its inner circumferential surface fitted with the side surface of the raised portion 102C.

The magnetic plate 108 is generally made of an iron-based material, and the external driving member is provided with a magnet, so that the magnetic plate 108 can attract the external driving member by magnetic force.

Three through holes 108B are formed between the inner and outer circumferences of the magnetic plate 108, and the reel hub 106A is inserted and fitted into the through holes 108B. The through holes 108B each having a small area in order to secure sufficient magnetic force however do not much contribute to the tightly fitted state between the magnetic plate 108 and the reel hub 106A. The friction at the inner and outer circumferential surfaces of the magnetic plate 108 mainly contributes to the secured fitted state.

Meanwhile, at the back side of the teeth 102A at the reel hub 106A, teeth 106C that project inwardly in the axial direction are formed intermittently along the circumference. The teeth 106C can be engaged with teeth 112A of a brake member 112.

The brake member 112 is mounted in the first case 104A slidably in the axial direction and un-rotatably. The brake member 112 is biased by a helical compression spring 114 to engage with the teeth 106C of the reel hub 106A in a normal state (which hereinafter refers to the state in which a tape cartridge is not set in a reading device or the like). In this way, the circular reel portion 106 is prevented from rotating.

In a space between the brake member 112 and the reel hub 106A and the teeth 106C in the circumferential direction, a brake disconnecting member 116 is mounted. The brake disconnecting member 116 is in a radial shape and has its tip ends 116A bent outwardly in the axial direction. The tip ends 116A penetrate through holes 102D formed in the gaps between the teeth 106C to project to the side of the teeth 102A in the normal state.

When the tape cartridge 100 is set in a reading device or the like and the external driving member is attracted by magnetic force toward the magnetic plate 108 into engagement with the teeth 102A, the external driving member presses the tip ends 116A of the brake disconnecting member 116 inside in the axial direction. The brake disconnecting member 116 allows the brake member 112 to slide inwardly in the axial direction against the biasing force of the helical compression spring 114, and releases the circular reel portion 106 from the brake member 112. In this way, the circular reel portion 106 can rotate.

Note that the reference characters 118A and 118B denote a pin and a clamp, respectively engaged with the drawing end of the tape. The reference numeral 120 represents a shutter that is biased by a helical torsion spring 122 and closed in the normal state while opened when the tape is to be drawn.

When the circular reel portion 106 and the external driving member are engaged with each other, the magnetic plate 108 is apart from the magnet of the external driving member by a very small gap, and the magnetic attraction force acts upon the magnetic plate 108 outwardly in the axial direction. More specifically, the magnetic plate 108 is biased in the direction away from the reel hub 106A.

Meanwhile, in order surely release the circular reel portion 106 from the brake member 112, the magnetic attraction force between the magnetic plate 108 and the external driving member is generally set to be significantly larger than the biasing force of the helical compression spring 114. Therefore, when the circular reel portion 106 and the external driving member are engaged, the magnetic plate 108 is strongly biased in the direction away from the reel hub 106A.

In order to prevent the magnetic plate 108 from being detached from the reel hub 106A, the magnetic plate 108 is fitted with the reel hub 106A such that the holding force to keep the magnetic plate 108 and the reel hub 106A fitted to each other is greater than the magnetic attraction force between the magnetic plate 108 and the external driving member.

However, the frictional force on the outer and inner circumferential surfaces of the magnetic plate 108 is likely to vary, and desired fitting force is sometimes not provided.

In addition, the resin material has a thermal expansion coefficient larger than the iron-based material, and therefore the frictional force between the side surface of the recessed portion 102B in the reel hub 106A and the outer circumference of the magnetic plate 108 is sometimes reduced as the atmospheric temperature rises. Note that when the atmospheric temperature rises, the frictional force between the side surface of the raised portion 102C at the reel hub 106A and the inner circumference of the magnetic plate 108 increases. Meanwhile, due to the presence of difference in length between the outer circumference and the inner circumference of the magnetic plate 108, the holding force to keep the magnetic plate 108 and the reel hub 106A fitted to each other as a whole is reduced.

Therefore, the holding force is insufficient to keep the magnetic plate 108 and reel hub 106A fitted to each other, so that the magnetic plate 108 could be detached from the reel hub 106A.

SUMMARY OF THE INVENTION

The present invention is directed to a solution to the above disadvantage, and it is an object of the present invention to provide a reliable tape cartridge to ensure that a magnetic plate and a circular reel portion can surely be kept fitted to each other.

According to the invention, the above object is achieved by forming a circumferential projection at the circumferential side surface of the magnetic plate and fitting the magnetic plate with the circular reel portion so as to be embedded in the circular reel portion at the circumferential projection.

More specifically, the above object is achieved by:

a tape cartridge according to the invention comprising: a resin circular reel portion, stored in a case, that has a side end central part in the axial direction facing the outside of the case and can be engaged/disengaged to/from an external driving member, and a magnetic plate made of a disk shaped member having magnetic properties, that is fitted to the side end central part of the circular reel portion so that its front surface in the thickness-wise direction is exposed and attracts the external driving member by magnetic force to allow the external driving member and the circular reel portion to be engaged with each other. The magnetic plate has a circumferential projection which is formed in a region more on the back surface side than on the front surface of the circumferential side surface and whose outer diameter is larger than that at the front surface side, so that the magnetic plate is fitted with the circular reel portion so as to be embedded in the circular reel portion at the circumferential projection thereof.

DETAILED DESCRIPTION OF THE PREFERRED EMBODIMENTS

Embodiments of the present invention will now be described in conjunction with the accompanying drawings.

Figure 1:
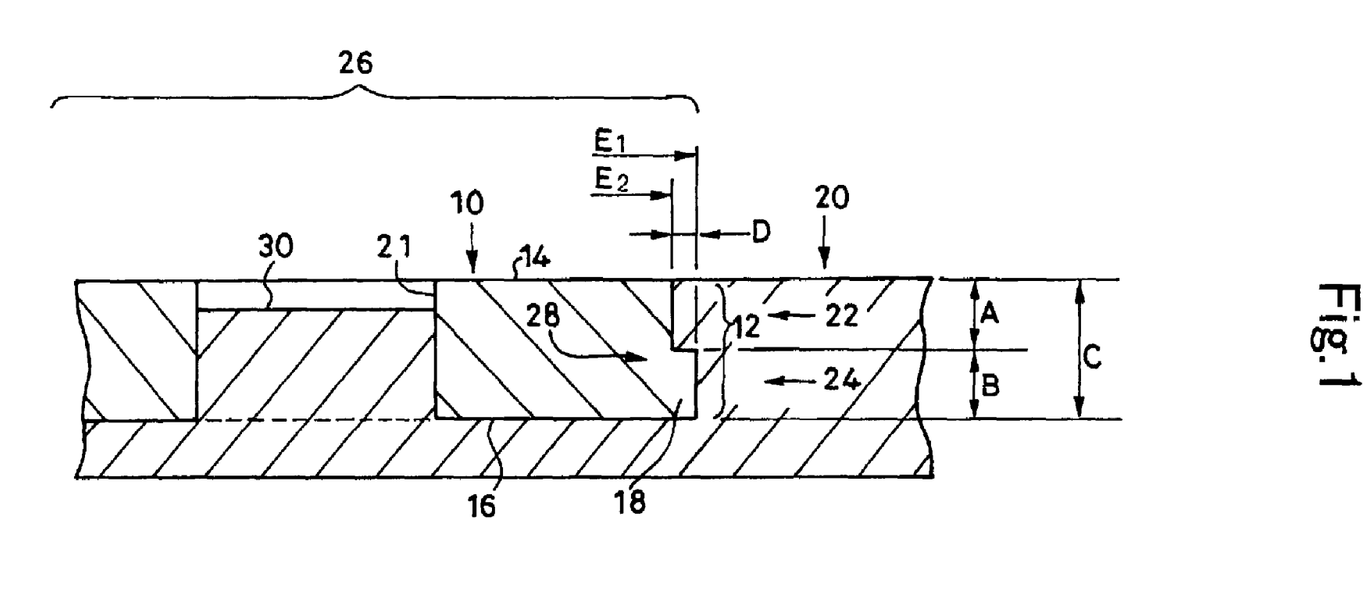
FIG. 1 is a side sectional view showing a fitted configuration of a magnetic plate according to a first embodiment of the present invention.

As shown in FIG. 1, a tape cartridge (whose general overview is not given) according to a first embodiment has a magnetic plate 10 and a circular reel portion 20. The magnetic plate 10 has a circumferential projection 18 in a region more on the side of its back surface 16 than on its front surface 14 of the circumferential side surface 12 thereof. The circumferential projection 18 has an outer diameter E1 in the region greater than an outer diameter E2 on the front surface 14. The magnetic plate 10 is fitted so as to be embedded in the circular reel portion 20 at the circumferential projection 18.

The other elements have the same structures as those of the conventional tape cartridge 100 shown in FIGS. 6 to 8, and therefore the same elements as those shown in FIGS. 6 to 8 will be denoted by the same reference characters and will not be described.

The magnetic plate 10 is an annular disk shaped member having a central hole 21 formed thereon. The plate is made of an iron-based SPCC steel plate having magnetic properties. The circumferential side surface 12 of the magnetic plate 10 is in a coaxial stepped shape having a small diameter portion 22 on the side of the front surface 14 and a large diameter portion 24 on the side of the back surface 16. The large diameter portion 24 forms the circumferential projection 18.

The ratio of the thickness A of the small diameter portion 22 and the thickness B of the large diameter portion 24 is 5:5 in this embodiment (in the range from 8:2 to 3:7).

The circular reel portion 20 is made of a polycarbonate resin containing 10% glass fiber. The circular reel portion 20 has a circular recessed portion 28 formed in its side end central part 26, and a raised portion 30 formed in the center of the circular recessed portion 28. The recessed portion 28 is as deep as the thickness of the magnetic plate 10 and has an inner circumferential surface in a stepped shape corresponding to the shape of the circumferential side surface 12 of the magnetic plate 10. Note that the length of the projection of the raised portion 30 is slightly smaller than the thickness of the magnetic plate 10.

The magnetic plate 10 and the circular reel portion 20 are integrally formed at the time of forming the circular reel portion 20 by resin-molding as they are heated. Then they are tightly fitted as they are cooled from the heated state.

Now, how the tape cartridge according to the first embodiment functions will be described. Note that the tape cartridge is characterized by the configuration of the magnetic plate 10 and the circular reel portion 20 fitted to each other, and the other configuration is the same as that of the conventional tape cartridge 100. Therefore, the different characteristic due to the fitted configuration of the magnetic plate 10 and the circular reel portion 20 will be described and the other function will not be described.

First, how the cartridge is produced and the function thereof will be described.

Figure 2:
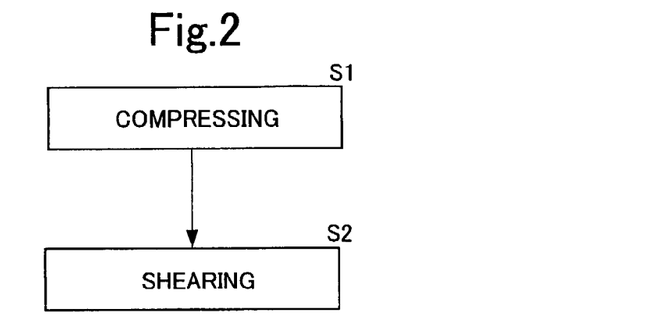
FIG. 2 is a flow chart showing a manufacturing process of a magnetic plate according to a first embodiment of the present invention.

As shown in FIG. 2, the magnetic plate 10 can be produced by a manufacturing method including a first step S1 of compressing the outer circumferential portion of a disk shaped member about by half of the thickness in the thickness-wise direction, thereby forming the small diameter portion 22 and the large diameter portion 24 coaxial to each other, and a second step S2 of shearing the outer circumference of the large diameter portion 24 into a circular shape coaxial to the small diameter portion 22, thereby allowing the outer diameter of the large diameter portion 24 to have a final target size.

According to the manufacturing method, the circumferential projection 18 of the magnetic plate 10 can be formed more efficiently than for example by cutting machining using a machine tool.

More specifically, the magnetic plate 10 has a coaxial stepped shape having the small diameter portion 22 and the large diameter portion 24, and therefore the manufacturing method as described above can be applied to achieve more efficient manufacture.

Then, the magnetic plate 10 is integrally formed with the circular reel portion 20 as they are heated at the time of forming the circular reel portion 20 by resin-molding. The recessed portion 28 of the circular reel portion 20 can easily have a stepped shape at its inner circumferential side surface since the circular reel portion 20 is integrally formed with the magnetic plate 10 and the inner circumferential side surface is shaped along the stepped circumferential side surface 12 of the magnetic plate 10. The stepped inner circumferential side surface and the circumferential side surface 12 of the magnetic plate 10 can surely be tightly contacted. In this way, the magnetic plate 10 can be fitted to the circular reel portion 20 so as to be embedded in the circular reel portion 20 at its circumferential projection 18.

After the resin molding, the magnetic plate 10 and the circular reel portion 20 are allowed to stand at ordinary temperatures and thus cooled from the heated state during the resin molding and they both contract. At the time, since the resin-based material has a greater thermal expansion coefficient than the iron-based material, the circular reel portion 20 contracts more than the magnetic plate 10 does. As a result, the magnetic plate 10 is engaged with the circular reel portion 20 by friction at the circumferential side surface 12 in a tightly fitted manner.

More specifically, the magnetic plate 10 is held between both sides in the thickness-wise direction by the circular reel portion 20 at the circumferential projection 18, and the magnetic plate 10 is engaged with the circular reel portion 20 by friction in a tightly fitted manner at the circumferential side surface.

How the cartridge functions in use will now be described.

When a tape cartridge is set in a reading device or the like and the circular reel portion 20 and the external driving member are engaged with each other, magnetic attraction force acts upon the magnetic plate 10 outwardly in the axial direction, so that the magnetic plate 10 is strongly biased in the direction away from the circular reel portion 20.

Meanwhile, the magnetic plate 10 is engaged with the circular reel portion 20 by friction in the tightly fitted manner at the circumferential side surface 12 by heating at the time of resin-molding followed by cooling after the resin-molding.

Note that when the atmospheric temperature rises, the engaging force by friction may be lowered but still remain as long as the temperature is lower than the temperature during the resin molding. It is generally known that tape cartridges are not used in the atmosphere whose temperature is higher than the temperature for resin molding. Therefore, the engaging force by friction is not lost with the rise in the atmospheric temperature.

The magnetic plate 10 is held between both sides in the thickness-wise direction by the circular reel portion 20 at the circumferential projection 18, so that in order to allow the magnetic plate 10 to be detached from the circular reel portion 20, the magnetic plate 10 must be biased with a load that can shear or deform the holding part of the circular reel portion 20. Stated differently, (in addition to the engaging force by friction), the holing power to keep the magnetic plate 10 and the circular reel portion 20 fitted to each other is sufficiently great.

Furthermore, the circumferential projection 18 is formed on the circumferential side surface of the magnetic plate 10, so that the holding portion of the circular reel portion 20 is long and not easily sheared or deformed, which further increases the holding force for the fitted state.

Therefore, when the circular reel portion 20 and the external driving member are engaged with each other and the magnetic plate 10 is biased in the direction away from the circular reel portion 20, the magnetic plate 10 is surely held in a stable manner by the circular reel portion 20 and is not detached from the circular reel portion 20. In this way, the tape cartridge according to the first embodiment is highly reliable.

Table 1 shows the holding force to keep the magnetic plate 10 and the circular reel portion 20 fitted to each other in the tape cartridge according to the first embodiment in comparison to that of the conventional tape cartridge.

TABLE 1

Initial value    unit: N

|  | Sample 1 | Sample 2 | Sample 3 | Sample 4 | Sample 5 | Average |
|---|---|---|---|---|---|---|
| Conventional Example | 185 | 190 | 170 | 240 | 210 | 199 |
| Embodiment | 280 | 300 | 280 | 310 | 270 | 288 |

Note that the holding force for the fitted state was measured by pressing the magnetic plate from the back surface side to the front surface side through small through holes formed in the circular reel portion as the load was gradually increased, and measuring the load when the magnetic plate was detached from the circular reel portion.

The magnetic plate 10 tested had a thickness C of 1 mm, an outer diameter E1 of 30 mm, and an inner diameter of 9 mm. The thickness A of the small diameter portion 22 was 0.5 mm, and the thickness B of the large diameter portion 24 was 0.5 mm. The step D in the radial direction between the small diameter portion 22 and the large diameter portion 24 was in the range from 0.1 mm to 0.3 mm.

Meanwhile, the conventional magnetic plate tested had a thickness of 1 mm, an outer diameter of 30 mm, and an inner diameter of 9 mm.

As can be understood from Table 1, the tape cartridge according to the first embodiment has the holding force to keep the magnetic plate and the circular reel portion fitted to each other significantly larger than (1.5 times) that of the conventional tape cartridge. Note that the holding force to keep fitted the magnetic plate of the size tested is 150 N at a minimum in terms of the LTO standards, while according to the first embodiment, the holding force to keep the magnetic plate in the fitted state is 288 N on average, which is about twice as large as the minimum value according to the standards.

Using a number of magnetic plates 10 having a fixed thickness C of 1 mm and different thicknesses A and B for the small diameter portion 22 and the large diameter portion 24, respectively, the holding force to keep the magnetic plate 10 and the circular reel portion 20 fitted to each other was measured. The result of measurement is given in Table 2.

TABLE 2

| ratio of size A to B (mm) | | |
| --- | --- | --- |
| A | B | force (N) |
| 0.9 | 0.1 | 190 to 290 |
| 0.8 | 0.2 | 250 to 290 |
| 0.7 | 0.3 | 250 to 310 |
| 0.6 | 0.4 | 260 to 310 |
| 0.5 | 0.5 | 270 to 310 |
| 0.4 | 0.6 | 250 to 310 |
| 0.3 | 0.7 | 230 to 260 |
| 0.2 | 0.8 | 160 to 250 |

As can be understood from Table 2, the holding force to keep the magnetic plate 10 and the circular reel portion 20 fitted to each other takes a relatively large value when the ratio of the thickness A of the small diameter portion 22 and the thickness B of the large diameter portion 24 is in the range from 8:2 to 3:7. More specifically, the holding force to keep the magnetic plate 10 and the circular reel portion 20 fitted to each other takes the maximum value when the ratio of the thickness A of the small diameter portion 22 and the thickness B of the large diameter portion 24 is in the range from 7:3 to 4:6 and is most stable.

Consequently, the ratio of the thickness A of the small diameter portion 22 and the thickness B of the large diameter portion 24 may preferably be set in the range from 8:2 to 3:7, more preferably from 7:3 to 4:6 to provide even better results.

A second embodiment of the invention will now be described.

Figure 3:
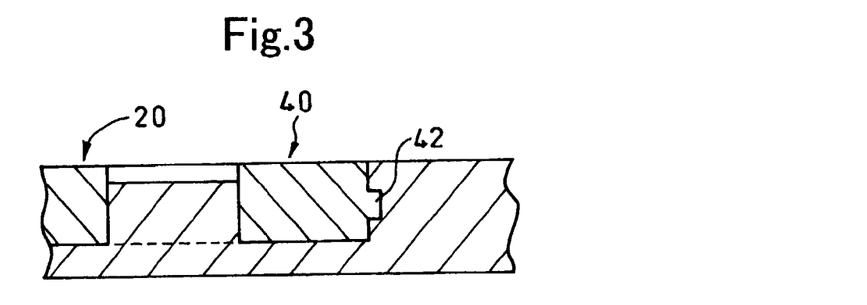
FIG. 3 is a side sectional view showing a fitted configuration of a magnetic plate according to a second embodiment of the present invention.

As shown in FIG. 3, in a tape cartridge according to the second embodiment, a magnetic plate 40 has a circumferential projection 42 formed nearer the center in the thickness-wise direction, and the magnetic plate 40 has a stepped shape coaxially and symmetrically formed in the thickness-wise direction as compared to the tape cartridge according to the first embodiment.

The other structure is the same as that of the tape cartridge according to the first embodiment, and therefore will not be described.

The magnetic plate 40 has a symmetrical stepped shape in the thickness-wise direction, and therefore the back and front sides of the magnetic plate 40 do not have to be determined when the magnetic plate 40 is integrally formed with the circular reel portion 20 by resin-molding. This can improve the working efficiency and prevent assembly mistakes.

Note that the ratio of the thickness A of the small diameter portion 22 and the thickness B of the large diameter portion 24 according to the first embodiment is 1:1 (within the range from 8:2 to 3:7), while the ratio is not limited to this, and may be any different ratio within the range from 8:2 to 3:7. In addition, a ratio such as 9:1 and 2:8 without the range may be employed. It is clearly understood from Tables 1 and 2 that the same effect of improving the fitting force over the conventional case is similarly provided in this case.

Figure 4:
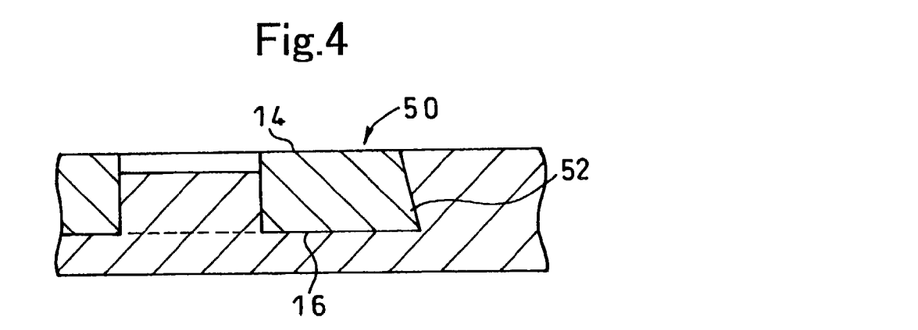
FIG. 4 is a side sectional view showing a fitted configuration of a magnetic plate according to a third embodiment of the present invention.

The magnetic plate 10 is in a coaxial stepped shape, according to the first embodiment, having the small diameter portion 22 and the large diameter portion 24. The invention is not limited to this, and the circumferential side surface of a magnetic plate 50 may have a tapered shape to expand toward the back surface 16 from the front surface 14 according to a third embodiment as shown in FIG. 4, and a circumferential projection 52 may be formed on the entire circumferential side surface.

Figure 5:
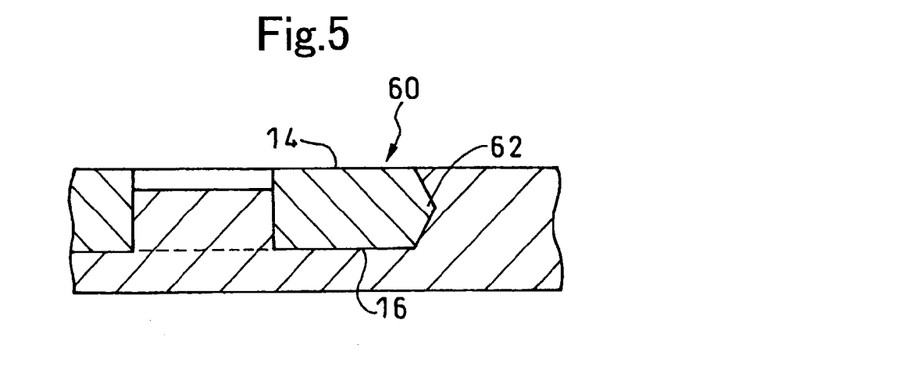
FIG. 5 is a side sectional view showing a fitted configuration of a magnetic plate according to a fourth embodiment of the present invention.

Furthermore, as in a fourth embodiment shown in FIG. 5, the circumferential side surface of a magnetic plate 60 may have a tapered shape to expand toward the center in the thickness-wise direction from both the front and back surfaces 14 and 16, and a circumferential projection 62 symmetrical in the thickness-wise direction can be formed for the entire circumferential side surface. In this way, the working efficiency can be improved and the assembly mistakes can be prevented similarly to the second embodiment.

As in the foregoing, according to the invention, the reliability of the tape cartridge can be improved by securing the holding force to keep the magnetic plate and the circular reel portion fitted to each other.

What is claimed is:

1. A tape cartridge, comprising:
a resin circular reel portion stored in a case, the circular reel portion having a side end central part in an axial direction facing the outside of the case and being at least one of engageable to and disengageable from an external driving member; and
a magnetic plate comprising a disk shaped member having magnetic properties, the magnetic plate being fitted to the side end central part of the circular reel portion so that a front surface of the magnetic plate in a thickness-wise direction is exposed, the magnetic plate attracting the external driving member by magnetic force to allow the external driving member and the circular reel portion to engage each other,
a circumferential side surface of the magnetic plate having a coaxial stepped shape with a small diameter portion on the front surface side of the magnetic plate and a large diameter portion on a back surface side of the magnetic plate, and
the magnetic plate having a circumferential projection which is formed in a region more on the back surface side than on the front surface of the circumferential side surface over a whole of an outer periphery of the magnetic plate, the outer diameter of the circumferential projection being larger than the outer diameter of the front surface side of the magnetic plate, so that the magnetic plate is fitted with the circular reel portion so as to be embedded in the circular reel portion at the circumferential projection of the magnetic plate.

2. The tape cartridge according to claim 1, wherein the magnetic plate and the circular reel portion are integrally formed as they are heated at a time of resin molding the circular reel portion, and tightly fitted to each other as they are cooled.

3. The tape cartridge according to claim 1, wherein a ratio of a thickness of the small diameter portion and a thickness of the large diameter portion is in a range from 8:2 to 3:7.

4. The tape cartridge according to claim 1, wherein a ratio of a thickness of the small diameter portion and a thickness of the large diameter portion is in a range from 7:3 to 4:6.

5. A tape cartridge, comprising:

a resin circular reel portion stored in a case, the circular reel portion having a side end central part in an axial direction facing the outside of the case and being at least one of engageable to and disengageable from an external driving member; and a magnetic plate comprising a disk shaped member having magnetic properties, the magnetic plate being fitted to the side end central part of the circular reel portion so that a front surface of the magnetic plate in a thickness-wise direction is exposed, the magnetic plate attracting the external driving member by magnetic force to allow the external driving member and the circular reel portion to engage each other, a circumferential side surface of the magnetic plate having a coaxial stepped shape symmetrical in the thickness-wise direction having two small diameter portions and a large diameter portion formed between the two small diameter portions, and the magnetic plate having a circumferential projection formed near a center of the magnetic plate in the thickness-wise direction over a whole of an outer periphery of the magnetic plate so that the magnetic plate is fitted with the circular reel portion so as to be embedded in the circular reel portion at the circumferential projection of the metal plate.

* * * * *